Figure 1:
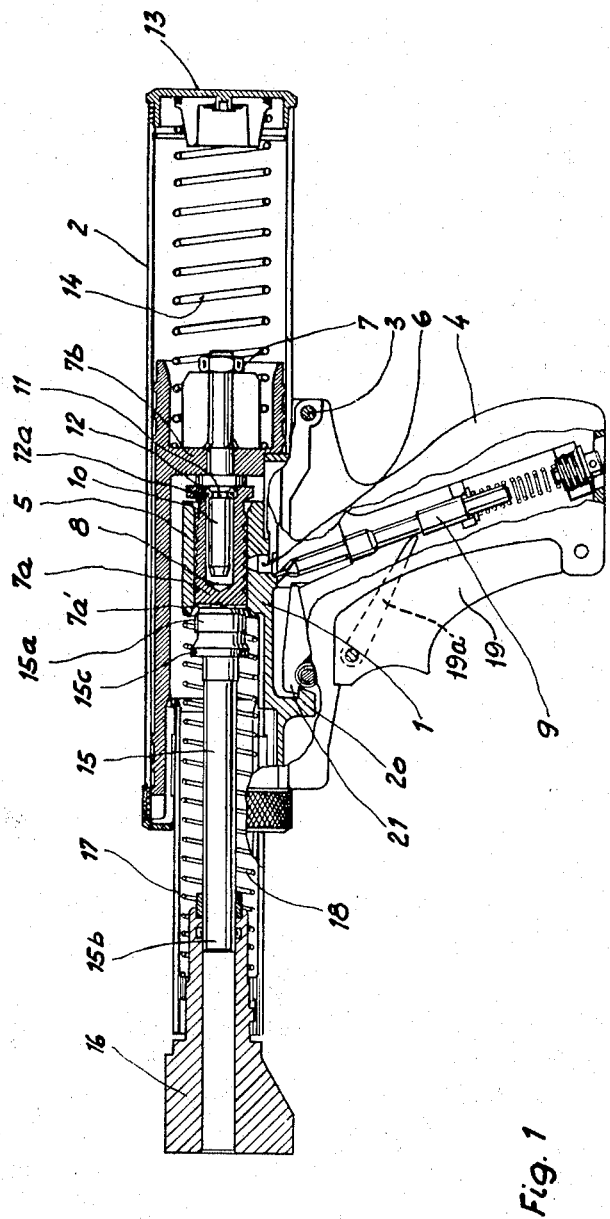

INVENTORS
ELMAR BATLINER
MANDRED HARTMANN
BY Curtis, Morris & Safford
ATTORNEYS

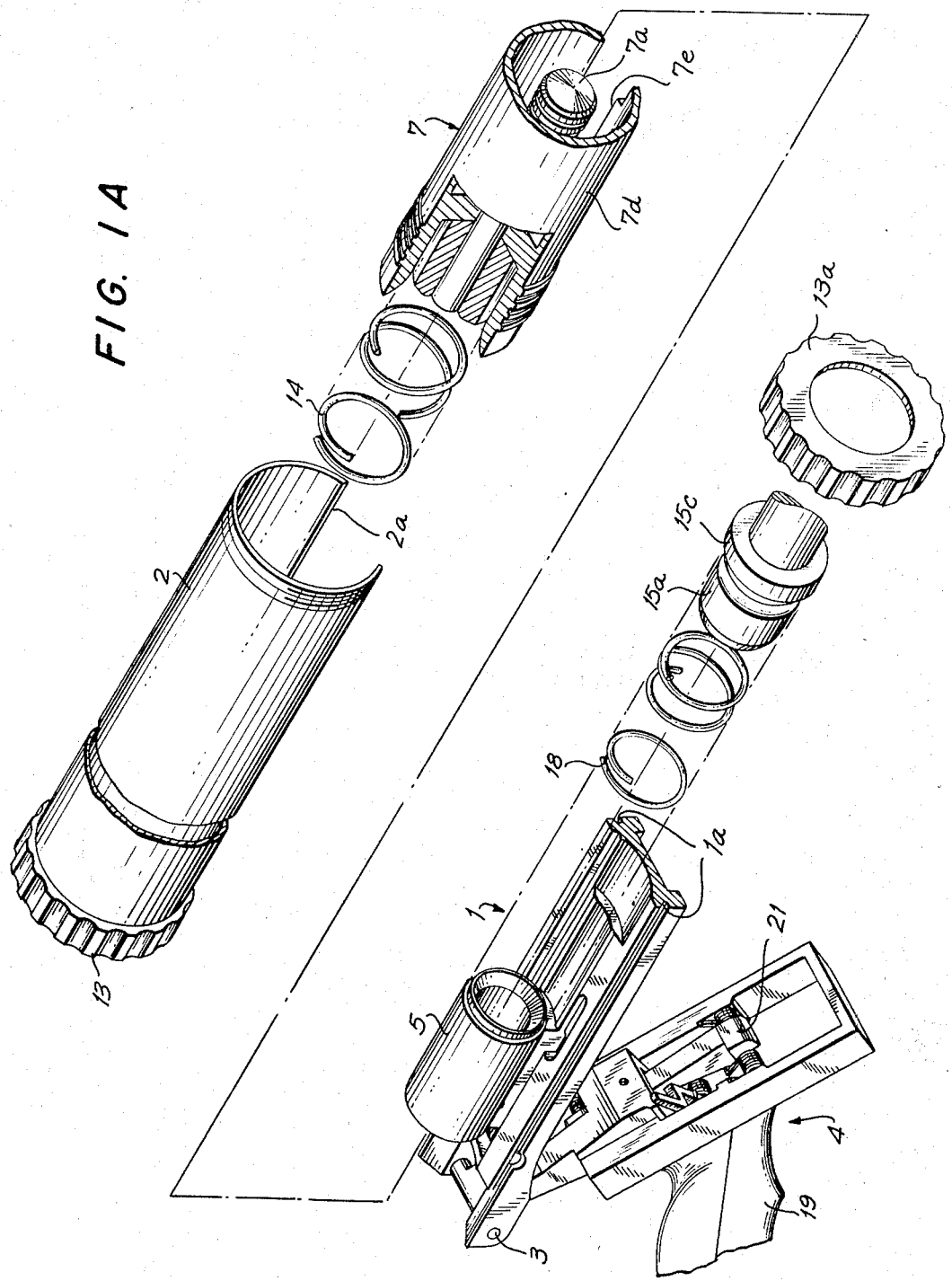

INVENTORS
ELMAR BATLINER
MANDRED HARTMANN
BY
Curtis, Morris & Safford
ATTORNEYS

United States Patent Office 3,325,074
Patented June 13, 1967

3,325,074
STUD DRIVING TOOL WITH TRIGGER SLEEVE
Elmar Batliner, Eschen, Liechtenstein, and Mandred Hartmann, Vorarlberg, Austria, assignors to Hilti AG., Schaan, Liechtenstein
Filed Apr. 14, 1965, Ser. No. 448,076
Claims priority, application Germany, Apr. 17, 1964, A 45,784
7 Claims. (Cl. 227—8)

The present invention relates to a device for driving studs into hard materials, such as iron and concrete, of the type having a housing in which a thrust piston driven by a propellent gas is slidably mounted and extends into a propellent gas chamber whose longitudinal axis is at an angle, preferably a right angle, to a cartridge chamber in which a cartridge containing the propellent charge is placed.

In known devices of this type, the propellent gas chamber is commonly formed by a blind bore, or recess, in the end of a thrust piston or by a space of annular cross-section bounded by the inner wall of a guiding sleeve receiving the thrust piston and the external surface of an end of the thrust piston, or a reduced part of the end, which projects into the sleeve.

Ordinarily in such devices both ends of the propellent gas chamber remain closed during the explosion of the charge and the pressure of the explosion is relieved through channels or openings of relatively small diameter. Moreover, the propellent gas chamber remains inaccessible during loading of a device of this type because it is unnecessary to expose the chamber when loading a fresh cartridge into the cartridge chamber, in contradistinction to tools having axial introduction of the cartridge. Thus, removal of combustion residues deposited in the propellent gas chamber by each explosion presents significant difficulties. Even with devices having relatively expensive and sophisticated means for residue removal, it is not always possible to remove sufficiently such residues.

It is, of course, highly desirable to remove the explosion residues regularly since they tend to collect in time to form a viscous or solid mass in the propellent gas chamber which hinders smooth operation of movable parts, i.e., the thrust piston, particularly after repeated use and/or a long interruption of use of the tool.

An object of this invention is to provide a stud driving device of the type described in which the foregoing disadvantages are substantially avoided.

The object is achieved in tools of the type described having a propellent gas chamber formed by a cylindrical sleeve mounted securely in the housing for the tool, by a slidable thrust piston extending into and closing one end of the sleeve, and by a piston-like end of a slidable recoil damping mass extending into and closing the opposite end of the sleeve when the tool is in the firing position. Upon firing of the tool, the propellent gas enters the propellent gas chamber from the cartridge chamber. The propellent gas expands in the gas chamber and drives the thrust piston and the recoil mass out of the sleeve. The thrust piston drives a stud. A strong spring between the damping mass and the housing of the tool is compressed by the recoil of the mass. After dissipation of the explosion pressure, the spring drives the piston-like end of the damping mass back into and substantially through, preferably entirely through, the sleeve. During the passage of the end of the damping mass through the sleeve, combustion product residues deposited on the interior surface of the sleeve are effectively removed therefrom and are driven through and out of the sleeve. Thus, the propellent gas chamber is effectively cleaned automatically after each use of the tool.

The desired cleaning action after each explosion of the tool is enhanced according to a preferred embodiment of the invention by proportioning the axial length of the sleeve and the portions of both the thrust piston and the damping mass which extend into the sleeve so the thrust piston and the damping mass are driven completely out of the sleeve by the explosion gases which can then escape unhindered through the opened ends of the chamber. The amount of combustion products deposited in the sleeve is thereby substantially reduced.

Enhanced cleaning action by the piston-like end of the recoil damping mass can also be obtained by providing one or more annular grooves on its periphery.

In a preferred embodiment of the invention, the piston-like end of the recoil mass is a separate element pivotally connected to the recoil mass. That arrangement substantially reduces the tendency of the piston-like end to bind in the relatively short sleeve, particularly when the recoil mass has been driven completely out of, and must re-enter, the sleeve.

Figure 2:
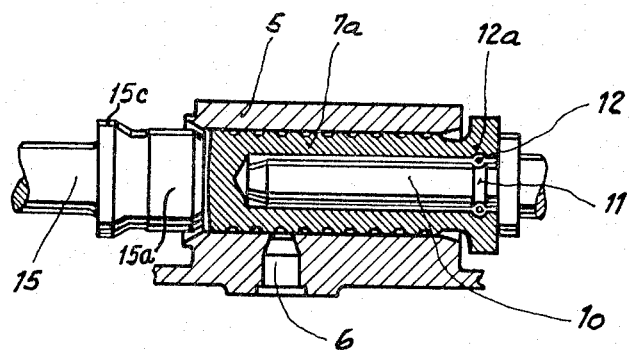
Figure 3:
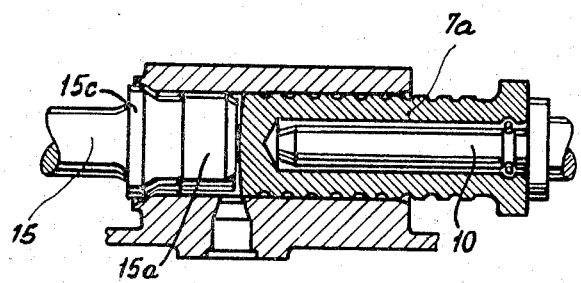
Figure 4:
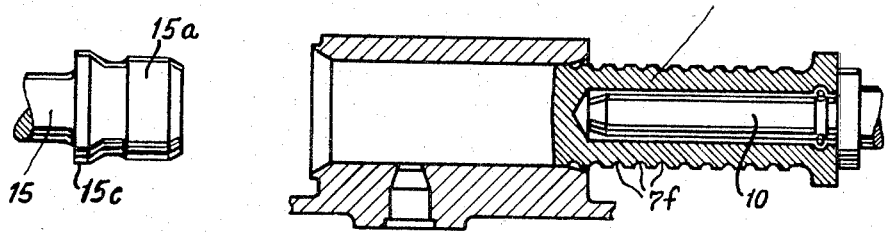
Figure 5:
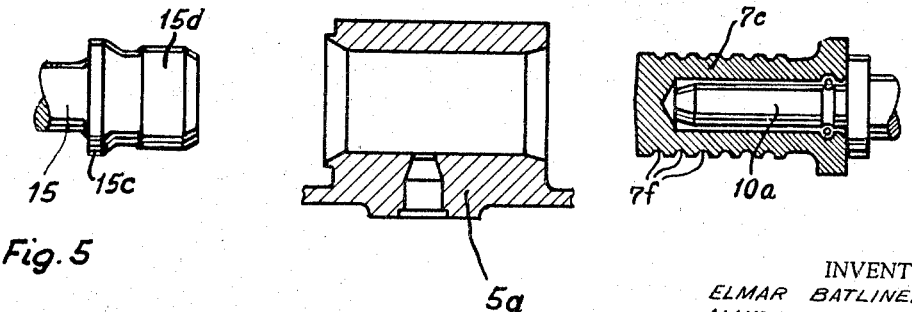

Further details of the invention can be understood by referring to the accompanying drawings which are given by way of example and in which:

FIGURE 1 is an elevation in section showing a tool according to the invention in the relaxed condition;
FIGURE 1A is a perspective showing important elements of the tool and their relation to one another;
FIGURE 2 is an elevation in section on an enlarged scale showing the propellent gas chamber, the elements thereof being in their positions shown in FIGURE 1;
FIGURE 3 shows the elements of FIGURE 2 in their firing position;
FIGURE 4 shows the elements of FIGURE 2 after firing of the tool; and
FIGURE 5 shows the elements of FIGURE 2 in a modified embodiment after firing.

FIGURES 1 and 1A show a supporting member 1 and a tube 2, which serves as a housing, mounted on said supporting member. The housing tube 2 has in one side a slot whose edges 2a slidably fit into grooves 1a on each side of the supporting member 1. The member 1 has a bearing pin 3 to which a handle, generally designated by the numeral 4, for the tool is pivoted to provide access to a cartridge chamber 6 in the supporting member 1. A sleeve 5 having a through-bore forming a propellent gas chamber is fastened to the supporting member 1, and preferably is integral therewith. A bore in the supporting member 1 that extends through the wall of the sleeve 5, preferably at substantially a right angle to the longitudinal axis thereof, and opens into the propellent gas chamber in the sleeve 5 forms a cartridge chamber 6.

A firing pin 9 in the handle 4 is operated by a trigger mechanism 19, 19a therein. The pin 9 is arranged to strike the bottom of a cartridge in the cartridge chamber 6.

A recoil damping mass 7 having a piston-like end 7a and a large mass 7b is slidably mounted in the tubular housing 2. The cylindrical outer wall 7d of the large mass 7b has a portion 7e cut away to enable the damping mass 7 to pass slidably over the sleeve 5 on the supporting member 1. In the position of rest of the device, i.e., when the tool is not ready to be fired, as shown in FIGURES 1 and 2, the piston-like end 7a of the damping mass 7 extends longitudinally through the sleeve 5. The end 7a which extends into sleeve 5 is secured to the main portion 7b of the recoil damping mass which is guided slidably by the inner wall of the tubular housing 2. One end of the part 7a of tthe recoil damping mass has a recess 8. A bolt 10 of smaller diameter than the recess 8 projects from the main damping mass 7b and extends loosely into the recess 8. The piston-like end 7a and the bolt 10 each have an annular groove, 12a and 11, respectively, into which a ring-spring 12 fits to hold the bolt 10 and end 7a together. Preferably, those two elements are loosely secured to allow radial play between them.

The housing 2 is closed at one end by a cover 13. A compression spring 14 is disposed between the cover 13 and the recoil mass 7. In the relaxed position, the spring 14 presses the recoil damping mass 7 and its end 7a toward and through the sleeve 5 to the position shown in FIGURES 1 and 2.

A thrust piston 15 is supported in the tool in known manner so that one end 15a extends into the sleeve 5 when the tool is in the firing position, as shown in FIGURE 3. In the position of rest, the end 15a rests adjacent to, but out of, the sleeve 5 on the side opposite the recoil mass 7. The other end 15b of the thrust piston is slidably mounted in a guide piece 16 in which a stud to be driven (not shown) is placed. The guide piece 16 fits into and is held by a sleeve 17 which, in turn, is slidably arranged within the tubular housing 2. A spring 18 serves to bias the guide sleeve 17 outwardly in the position of rest.

Charging of the tool is effected by tilting the handle 4 about the pin 3 to expose the cartridge chamber 6 into which a cartridge can be inserted. The handle is then swung back and locked to the supporting member 1 by a snap lock 20 and 21. Accidental firing of the tool is precluded by safety and locking mechanisms which are not shown in detail. After a cartridge has been inserted, a stud to be driven is inserted into the guide piece 16. The guide piece 16 is then pressed against the object into which the stud is to be driven, and the sleeve 17 is pushed into the housing 2 so that the end 15a of the thrust piston 15 enters the sleeve 5 until the piston 15 is stopped by the abutment of its flange 15c against the sleeve 5, as shown in FIGURE 3. From that position, the safety mechanism (not shown) is released and the tool can be fired.

The pressure produced in the propellent gas chamber by the explosion drives the thrust piston 15 with a stud ahead of it toward the left and drives the recoil mass 7 to the right to the positions illustrated in FIGURE 4. Spring 14, which was partly compressed by the entry of the end 15a of the thrust piston into the sleeve 5 when the tool was put into its firing position, is further compressed by the recoil of the damping mass 7. The spring 14 returns the recoil mass 7 to its rest position as shown in FIGURES 1 and 2. During the return of the recoil mass 7, its piston-like end 7a passes through the sleeve 5 from within which it effectively removes the explosion gas residues deposited on the interior wall of the sleeve 5 and pushes them through and out of the sleeve. Annular grooves 7f on the outer surface of the end 7a facilitate removal of the residues. In this way, the sleeve 5 is dependably cleaned after each firing of the tool. Residues remaining on the end faces of the part 7a and the thrust piston 15a are reasonably effectively blown off and out of the chamber by the explosions of subsequent firings of the tool.

FIGURE 5 illustrates an embodiment of the invention in which the axial lengths of the sleeve 5a and the end 7c of the mass 7 are somewhat shorter than in the previously described embodiment. Thus, when the tool is fired, the thrust piston 15 and the recoil damping device mass 7 are rapidly and completely driven out of the sleeve 5a. The explosion gases freely pass out of the sleeve so the amount of residue from them deposited in the sleeve of the combustion chamber is substantially reduced.

To assure smooth travel of the piston-like end 7a of the recoil mass 7 through the sleeve 5 and to counteract possible jamming of those parts, the piston 7a is loosely secured with radial play to the bolt 10 extending from the part 7b of the recoil mass. Thus, on penetration of the piston 7a into the sleeve 5, particularly in an embodiment illustrated by FIGURE 5 where the mass 7 is completely outside the sleeve 5a after firing, the piston 7c can align itself within the sleeve 5a independently of the alignment of the recoil mass 7b with respect to the sleeve. Similarly, the outer diameter of the end 15d of the thrust piston is preferably sufficiently smaller than the inner diameter of the sleeve 5a to allow a limited amount of radial play therebetween. Also, it is desirable to develope the end face of the piston 7a, 7c as a flattened conic surface having an apex angle of nearly 180°.

It is to be understood that numerous modifications and changes can be made in the embodiments described herein by persons skilled in the art without departing from the scope of the invention as defined in the appended claims.

We claim:

1. A stud driving tool comprising a supporting member, a housing mounted on said supporting member, a sleeve on said supporting member having a through-bore therein forming a propellent gas chamber, a thrust piston slidably mounted in said housing having a first end adapted to enter an end of said gas chamber to place said tool in the firing position, a recoil damping mass slidably mounted in said housing having an end adapted to pass substantially through said gas chamber from the end opposite said thrust piston when said tool is not in the firing position and to be pushed by said first end of said thrust piston partially out of said gas chamber when said tool is in said firing position, a recoil spring in said housing bearing against said recoil mass to drive said end of said recoil mass through said gas chamber, guide means in said housing for receiving a stud to be driven, said thrust piston having a second end adapted to drive a stud in said guide means, a bore in said supporting member extending through a wall of said sleeve to said propellent gas chamber forming a cartridge chamber, a handle extending from said supporting member for holding the tool, and firing means carried by said handle including trigger means and firing pin means adapted to contact a cartridge in said cartridge chamber to fire said cartridge, the propellent gases from said cartridge entering into said propellent gas chamber and expanding between said first end of the thrust piston and said end of the recoil damping mass therein in said firing position to drive said thrust piston out of said gas chamber, and thereby to drive a stud in said guide means, and to drive said recoil mass against said recoil spring, the recoil of said spring thereafter driving said end of the recoil mass back through said gas chamber after dissipation of said propellent gas whereby combustion product residues deposited on the interior surface of said gas chamber are effectively removed and pushed out of said gas chamber.

2. A stud driving device according to claim 1 wherein said recoil mass is driven completely out of the gas chamber when the tool is fired and said recoil spring drives said recoil mass back into said gas chamber.

3. A stud driving device according to claim 1 wherein said end of said recoil mass has at least one annular groove to facilitate removal of said deposited residues.

4. A stud driving device according to claim 1 wherein said end of said recoil mass is a separate piece from said recoil mass and is loosely secured thereto.

5. A stud driving device according to claim 4 wherein a bolt projects from said recoil mass and extends into a recess in an end of said piece, and having concentric annular grooves in said recess and on said bolt respectively, and a ring-spring spaced between said grooves.

6. A stud driving device according to claim 1 wherein the end face of said end of said recoil mass is a substantially flat conic surface.

7. A stud driving device according to claim 1 wherein the axis of said cartridge chamber is at substantially a right angle to the axis of said gas chamber.

No references cited.

GRANVILLE Y. CUSTER, JR., *Primary Examiner.*